United States Patent
Kagan et al.

(10) Patent No.: US 6,507,671 B1
(45) Date of Patent: Jan. 14, 2003

(54) METHOD AND SYSTEM FOR DROPPING TEMPLATE FROM A FILLED IN IMAGE

(75) Inventors: Oren Kagan, Haifa (IL); Aviad Zlotnick, Mitzpeh Netofah (IL)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/457,582

(22) Filed: Dec. 9, 1999

(30) Foreign Application Priority Data

Dec. 11, 1998 (EP) .............................................. 98480087

(51) Int. Cl.[7] .................................................. G06K 9/34
(52) U.S. Cl. ........................ 382/173; 382/209; 382/228; 382/172; 358/464; 707/500
(58) Field of Search ................................. 382/168–180, 382/224–239, 209, 48, 221; 358/450–464; 707/500, 530–541

(56) References Cited

U.S. PATENT DOCUMENTS

| | | | | |
|---|---|---|---|---|
| 5,091,964 A | * | 2/1992 | Shimomura | 382/174 |
| 5,182,656 A | | 1/1993 | Chevion et al. | 358/452 |
| 5,191,525 A | * | 3/1993 | LeBrun et al. | 707/500 |
| 5,204,756 A | | 4/1993 | Chevion et al. | 358/426 |
| 5,394,487 A | * | 2/1995 | Burger et al. | 382/228 |
| 5,631,984 A | * | 5/1997 | Graf et al. | 382/317 |
| 5,784,487 A | * | 7/1998 | Cooperman | 382/175 |
| 5,793,887 A | | 8/1998 | Zlotnick | 382/209 |
| 5,852,676 A | * | 12/1998 | Lazar | 382/173 |
| 5,956,422 A | * | 9/1999 | Alam | 382/181 |
| 6,009,196 A | * | 12/1999 | Manhoney | 382/176 |

* cited by examiner

*Primary Examiner*—Jingge Wu
(74) *Attorney, Agent, or Firm*—Karl O. Hesse

(57) ABSTRACT

In an image processing system for processing filled in forms, a method and system are disclosed for removing the fixed part or template of a form without altering the variable part or information filled into the form. Whenever the variable part overlaps a fixed part of a filled in form a straightforward removal of the template creates gaps in the information characters making them unrecognizable by Optical Character Recognition (OCR) Software. This problem is overcome, according to the invention, by scanning a filled in form using any appropriate optical device capable of capturing images made of gray level pixels. First the fixed template pixels and the variable information pixels are separated from each other based on pixel position. Thereafter, the fixed and variable part populations of pixels are further analyzed so that gaps can be filled by moving pixels from the fixed part to the variable part on the basis of their gray levels thus, permitting to filling the gaps.

16 Claims, 6 Drawing Sheets

Typed-in information shifted versus template
FIG. 1
| TOTAL CHARGE | 29. AMOUNT PAID | 30. BALANCE DUE |
|---|---|---|
| 855.00 | $ 331.19 | $ 82.79 |
PHYSICIAN'S, SUPPLIER'S BILLING NAME, ADDRESS, ZIP CODE
FIG. 2A
FIG. 2B
FIG. 2C

5556 57 8881 82 838

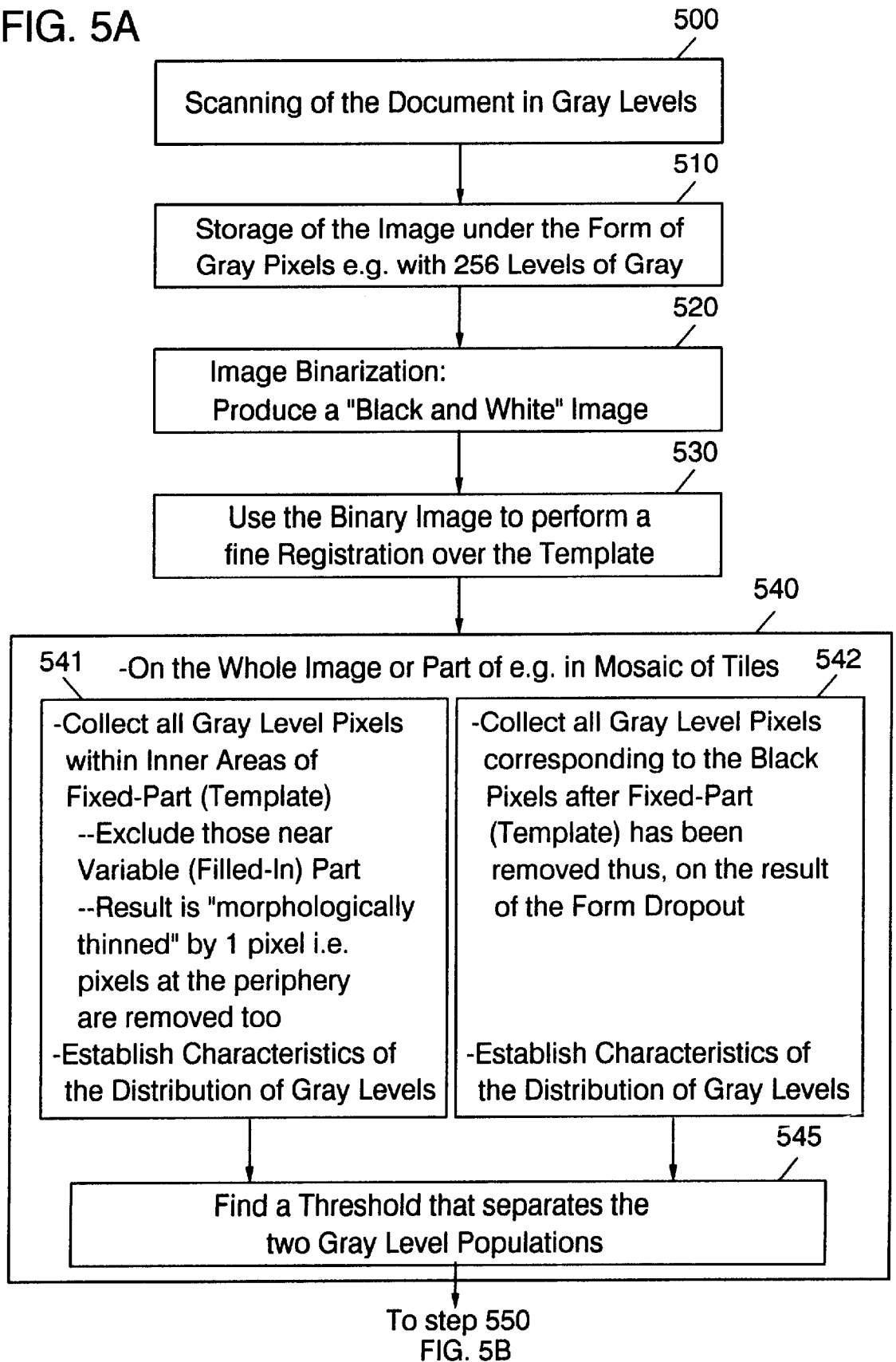

METHOD AND SYSTEM FOR DROPPING TEMPLATE FROM A FILLED IN IMAGE

FIELD OF THE INVENTION

This invention relates generally to the processing of images such as images resulting from reading documents by an optical scanner and more particularly to a method for separating a fixed part of the image i.e. the template from filled in information.

BACKGROUND ART

The deployment of computers in all aspects of everyday life, along with the dramatic increase of their direct and associated storage capacity combined with their ability to be interconnected, thus forming networks on which information easily circulates, is considerably influencing the way administrative tasks are carried out. Instead of handling tons of paper forms and documents, information is digitized and stored in the form of files in nonvolatile computer memories and, often, in huge dedicated storage units. Thereafter, the information is quickly retrieved when needed and is available in any place, having access to the network and the proper equipment to display it or print it, regardless of the location where information is actually stored. A typical example is a nationwide insurance company electronically storing all customer contracts such that every branch and agent can have access to any of them as needed.

Gathering information from individuals wherever they are at a particular moment, for example, the customer of an insurance company or the patient in a hospital, is generally considered to be a cumbersome and error prone type of work. If entered directly from a computer keyboard, the input of requested information is time consuming, generally requires a third party, such as an agent in a branch office or generally speaking an attendant, acting as a typist while the individual provides sometimes private and essential pieces of information without immediate feedback. Moreover, this way of interfacing computers does not permit convenient entry of anything but textlike information and does not permit entry of a signature that could somehow authenticate the input record.

Thus, a preferred mode of interfacing, made possible since the storage and processing capabilities of computers have dramatically improved, consists in having a form filled in directly by the individual providing the information who is assumed to be able to self check its content. The form or the document is then fed into a reading device, such as an optical scanner, which transforms the acquired information into machine readable code permanently stored for later and possibly repeated processing so as to extract and only retain the informative part of the form excluding the template. The template comprises all the fixed forms and text whose only purpose was to guide and instruct the individual filling in the form with the required information. The filled in information or variable part, which generally differs from one document to the other, has only to be associated with a particular form, stored only once, so as to be able to reconstruct the complete filled in form if that ever becomes necessary.

The above described mode of interfacing computers is also frequently used whenever archives are digitized so as to be stored in electronic storage means rather than being kept in conventional storage units, thus saving a considerable amount of space and granting to the archives all the advantages of an electronic document that becomes available simultaneously at many places and is easily retrievable. Whenever archives are filled in forms such as the documents resulting from a census, all of what is discussed here applies.

Because the scanning of forms and documents must be performed with a sufficiently high resolution so that no entered information is lost or is significantly altered, becoming unrecognizable, the reading devices usually produce a high volume of scan data. Although the size of computer memories increase each year, the amount of stored information has to be limited to a reasonable size to permit the permanent storing of documents, the total size of which may have to be expressed in units of millions of pages. This limitation becomes obvious for economic reasons and the practical limitations on the maximum size of the storing devices. Another important reason for which the amount of stored information must be drastically limited deals with the fact that, as mentioned earlier, the documents are generally made available over a network and must be transferred, upon request, to the end user, sometimes through communication links or virtual connections that would have an insufficient bandwidth to permit the transfer of excessively large documents to complete within an acceptable response time. As a typical example, a page of A4 size (297×210 mm), scanned at 100 pixels/cm, requires about 700 Kbytes of storage space. If it is transferred over a standard 64 kbits/sec communication channel this would take about 90 seconds. A time that is about two orders of magnitude higher than what is tolerable. Thus, algorithms and methods, known of the art, to compress data are generally applied which reduce the amount of raw data coming out from the scanner typically by at least one order of magnitude. The A4 document is thereby reduced to below 70 Kbytes. However, even before applying compression techniques, a very significant step towards the reduction of stored data is accomplished by removing the fixed part of the form and retaining only the unique entered information. The entered variable information accounts, typically, for only 10% of the scanned data, thus providing another order of magnitude reduction.

On top of being a significant contributor to the reduction of the amount of data to be stored, and to be transferred to the user, the removal of the template has a second very important objective. It is key to permitting subsequent flawless running of optical character recognition (OCR) software, aimed at interpreting the variable part of the form, so that the variable entered information contents can effectively be processed according to the purpose for which the forms have been designed.

Preventing the fixed part of a form from being stored can be achieved during the scanning process itself. One method for the elimination of the fixed template has been reported by D. E. Nielsen and al., in "Evaluation of Scanner Spectral Response for Insurance Industry Documents", 16/A44 NCI Program, Working Paper No. 2. May 1973. This method, also known as "dropout ink" technique, is based on the idea to use a special color ink when printing a form that is transparent to conventional scanners. If a completed form of this type is scanned, the fixed pattern is invisible to the scanner, and only the variable part is captured. On top of being more expensive an obvious disadvantage of using special ink sensitive scanners is that it prevents the application of this approach to existing archives.

Thus, another approach for the separation of the form template background from the filled-in information has been disclosed in U.S. Pat. No. 5,182,656 entitled "Method for Compressing and Decompressing Forms by Means of very large Symbol Matching". According to this approach, empty forms, the fixed parts, are prescanned and the data obtained is digitized and stored in a computer memory to create a library of forms. The original filled in form is then scanned, the data obtained is digitized and the retrieved representation of the empty form is eventually subtracted, the difference being the digital representation of the variable part i.e. the filled in information. In order to perform such form elimination, it is necessary to precisely align the input form image with an image of the empty template. Even when the input form image is globally aligned with the template and there are no offset, skew or scale differences, there usually are local distortions that must be straightened out before the template can be dropped out. Such local distortions are frequently the result of inconsistent scanner performances or distortions from photocopying.

A method to compute fine registration in order to align the fixed part with respect to the variable part of an image is described in European patent application EP-A-0 411 231 (U.S. Pat. No. 5,182,656), which has already been mentioned above and in EP-A-0 411 232 (U.S. Pat. No. 5,204, 756) entitled "Method for High-Quality Compression of Binary Text Images". Assuming that the local distortions are small, and piece wise linear, both the input and the template image are broken into small blocks and histogram correlation is used to find the relative offsets of corresponding blocks.

Although the above described technique usually works quite well, improved reliability is often required. As an example, this is the case when distortions, accumulated through several iterations of copying a form, goes beyond the recovery capability of the technique. Thus, an improved method for template elimination has been described in U.S. Pat. No. 5,793,887 with the title "Method and Apparatus for Alignment of Images for Template Elimination". The chief object of this invention is to improve the handling of images with nonlinear distortions in order to be able to make known template elimination techniques more effective in overcoming the problem of the local distortions and to be able to achieve a fine alignment of the input image over the empty prestored reference template image. This is achieved through the use of a more robust optimal correspondence subsequence (OCS) algorithm which comprises the steps of correlating lines of a reference template image to lines in a variable template image by finding corresponding pairs of projections in one direction of the lines in the reference template image and the variable template image, determining the displacement of the two projections of lines of each pair in a direction perpendicular to said direction of projection and evaluating the number of rows or columns the picture elements of each line of the variable template image has to be shifted to achieve a match between the pairs of projections, and generating a new input image by shifting the picture elements of lines of the variable template image perpendicular to the direction of projection as determined in the last step.

Thus, the technique for removing templates from the image of filled in forms works well after the major improvements, briefly described herein above. These additions to the initial method take care of the linear and nonlinear local distortion, permitting complete removal of the template thus, avoiding the use of forms that must be printed with special ink invisible to scanners.

However, a very disturbing problem is still unresolved after the template has been removed, irrespective of the precision and quality of the template removal process. Human beings tend to be careless when filling in forms. Very often the hand written information covers part of the template. Similarly, when forms were filled out using typing machines, which is often the case of archives, typing was frequently shifted with respect to the template due to an imprecise positioning of the form into the typing machine. In this case, complete lines of typed information are stricken over by lines of the template. Then, removing the template lines creates gaps in the characters of the filled in information. The black dots, or picture elements that are common to the filled in information and to the template, are all deleted. Thus, if the first objective of significantly reducing the amount of data to be stored and transmitted by removing the template is done well, the second goal of permitting flawless running of OCR software is not fulfilled. Indeed, if the template has been removed from overlying characters, gaps have been created in the characters that may make them unreadable or even worse misinterpreted. An example of this situation being a 2, with its horizontal bottom line covering the template that wrongly becomes a 7. This may have a stunning effect if this is the most significant digit of a monetary transaction.

Although, scanners able to analyze images in gray levels have been available for years their use is only now spreading out as their cost has been reduced enough to become competitive with simple black and white scanners. Therefore, it is an object of this invention to take advantage of the capability of those machines to have each image pixel represented by a gradation of gray levels from white to black, usually in 256 steps, so as to overcome the problem of the gaps created when the template is removed.

It is a further object of the present invention to retain the advantage of the previous methods where the storing of the variable part is eventually a binary image, made of black and white dots, requiring a minimum amount of memory and thus being transferable to an end user within an acceptable response time in spite of limitations of bandwidth on certain wide area networks.

SUMMARY OF THE INVENTION

In a system for processing images of filled in forms, a method is disclosed for dropping the fixed part or template of a form without altering the variable part of filled-in information. The method comprises the steps of:

scanning the filled in form for generating an image of the form consisting of picture elements, each carrying a level of gray depending on the brightness of the pixel;

storing the image of the filled in form in gray levels;

retrieving an image of the fixed part previously stored;

registering the image of the filled in form over the image of the fixed part in order to distinguish between variable part pixels and fixed part pixels from their position;

collecting the pixels positioned within the fixed part, excluding those pixels near the variable part and morphologically thinning the fixed part by excluding those of the pixels positioned at the periphery in order to establish a first statistic on the levels of gray of the fixed part;

collecting the remaining pixels, all belonging to the variable part and establishing a second statistic on the levels of gray of the variable part pixels;

comparing the first and second statistics;

moving those fixed part pixels which are statistically significantly different, to the variable part of the image of the document.

In a preferred embodiment of the invention the comparison of the first and second statistics established over the fixed part and variable part populations of pixels permits establishing a first gray level threshold statistically separating the variable part pixels from the fixed part pixels, in preparation to move all pixels belonging to the fixed part population, darker than the threshold, to the variable part population.

The preferred embodiment of the method further includes the steps of:

preprocessing the gray level image, selecting groups of neighbor pixels and weighting their gray level values to a common value;

collecting the pixels positioned near the variable part, within the fixed part and establishing a third statistic on their levels of gray;

collecting all the pixels within the updated population of the variable part for, establishing a fourth statistic on the levels of gray of the updated population;

finding a second gray level threshold, computed from the above described third and fourth statistics, which statistically separates the variable part pixels from the fixed part pixels;

moving all pixels belonging to the fixed part population, darker than the second threshold and adjacent to variable part pixels, to the variable part population.

The method of the invention permits differentiating the variable part of a form from its template, even when they overlap, in order to overcome the problem of the gaps created when the template is removed. This objective is achieved, at without the extra costs of scanner invisible ink. Where ever the fixed part is printed with a different level of gray or a different color, translating into a different level of gray after the scanning process, as compared to the color or level of gray of the variable part, yields populations of pixels that are statistically different, whereby the gaps that would otherwise result from a brute force removing of template, can be filled by the method and system of the invention.

These and other advantages of the invention will become apparent to those skilled in the art of image processing from the following specification with reference to the drawings.

BRIEF DESCRIPTION OF THE DRAWINGS

FIG. 1 is an example of a portion of a form that was filled with information that is shifted and covers portions of the template.

FIG. 2 shows a picture of part of a form filled with hand written information at (A), the template alone at (B) and the resulting image at (C) when the template is subtracted according to the prior art including gaps in the characters.

FIG. 4-$b$ illustrates the minimum for establishing a separating threshold based on the distributions of the two histograms shown in FIG. 4-$a$.

FIG. 5-$b$ is a flow diagram of the final steps of the invention which fill the gaps that would otherwise be created by the simple removal of the template according to prior art.

DETAILED DESCRIPTION OF THE PREFERRED EMBODIMENT

The instant invention solves the problem of gaps created in the filled in contents of forms when the template is removed in the very frequent cases where they overlap. The invention uses gray level images of filled in forms to move picture elements back into gaps in the filled in information.

FIG. 1 shows part of a form that was filled in with a typing machine. It illustrates the fact that, very frequently, the typed in information is shifted and slightly rotated with respect to the template due to an improper positioning of the empty form into the typing machine. In this particular example the beginning of the typed line i.e. the content of the 'TOTAL CHARGE' box is almost correctly positioned while the end of the line, in the 'BALANCE DUE' box, has its bottom part definitively covering the template. In this case the numeral 2 will be at best unreadable or more likely interpreted as a 7 by the Optical Character Recognition (OCR) software to be run on the content of the form once the template has been removed. The 2 will appear as a 7 since the bottom line of the 2, covering the template, will have been removed.

FIG. 2A is another example of part of a form that was filled with hand written information. In this case the positioning of the characters tend to be more random. However, the end result is about the same. Number 3 of the filled in information, the second to last on the right, is definitively covering the template. Thus, when the picture elements of the template (B) are removed it gives the result depicted in (C). Therefore, gaps are created in the numbers covering the template. Especially, the above described numeral 3 is seriously altered and is likely to be wrongly interpreted as the number 2 while it is actually the number 3.

Figures 3A, 3B:
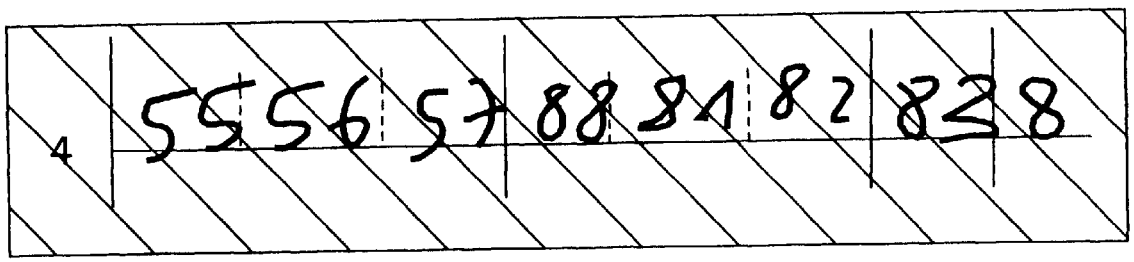
FIG. 3 depicts at B, the result after removal, according to the invention, of the template from the same filled in form of FIG. 2-$a$, yielding gapless easily recognizable characters.

FIG. 3B illustrates the result obtained when applying the invention that takes advantage of the capability to scan and process forms in gray levels. Instead of representing every pixel in the image as being either black or white the image is represented in multiple levels of gray, usually 256. This permits to differentiation between a template at one range of gray levels from ink used for filling in the form at another range of gray levels. This is especially required at places where the variable parts overlap the fixed parts which is precisely where gaps were created in the filled in characters by previous methods. Gathering statistics from the fixed template and variable filled in parts of the image and further analyzing the darkness at these spots allows filling in the gaps that were otherwise created by the simple removing of the template from a bi-level black and white image. In this way the instant invention obtains characters without gaps as shown in FIG. 3B, which may be subsequently submitted to OCR software for more accurate and efficient interpretation of the variable part. FIG. 3A also illustrates the case where the background over which hand writing is done is not simply a white area but rather translates, in this particular example, into a plain light level of gray after scanning. The background may also be a pattern in itself like is often the case with bank checks. The method operates in two passes after a fine registration, from the prior art, of the form template over the scanned image permitting separation of, based on their position, the fixed part pixels from those of the variable part. Statistically comparing the two populations of pixels thus created, a first gray level separating threshold is computed according to the method of the preferred embodiment of the invention or with an equivalent alternate method to statistically differentiate the two populations of pixels. This permits reassessing the division of the gray level pixels between fixed and variable parts on the basis of their level of gray, and allows moving a first contingent of pixels, that were found in the fixed part areas after registration, to the variable part. In a subsequent treatment of the gray level image further analyzing the population of pixels from fixed and variable parts, close to each other, a second threshold is computed, again employing the method of the preferred embodiment or an equivalent alternate method thus, allowing movement of more pixels from fixed to variable parts so that gaps are eventually filled.

Figure 4A:
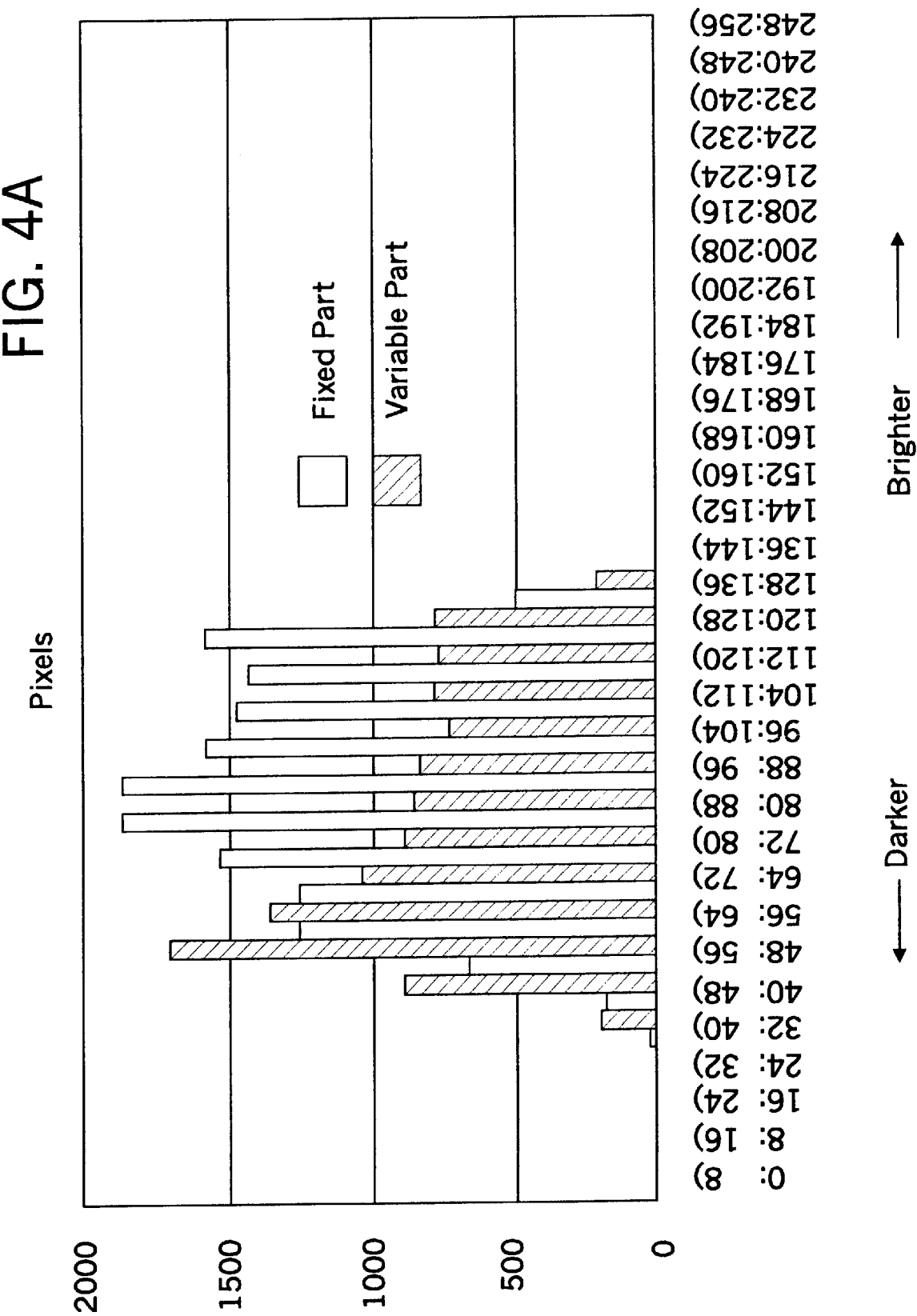
FIG. 4-$a$ shows two histograms, typical of the variable and fixed parts, displayed under the form of pixel frequency counts spread over 32 classes of gray levels ranging from 0, the darkest, on the left, to 256, the brightest, on the right.
Figure 4B:
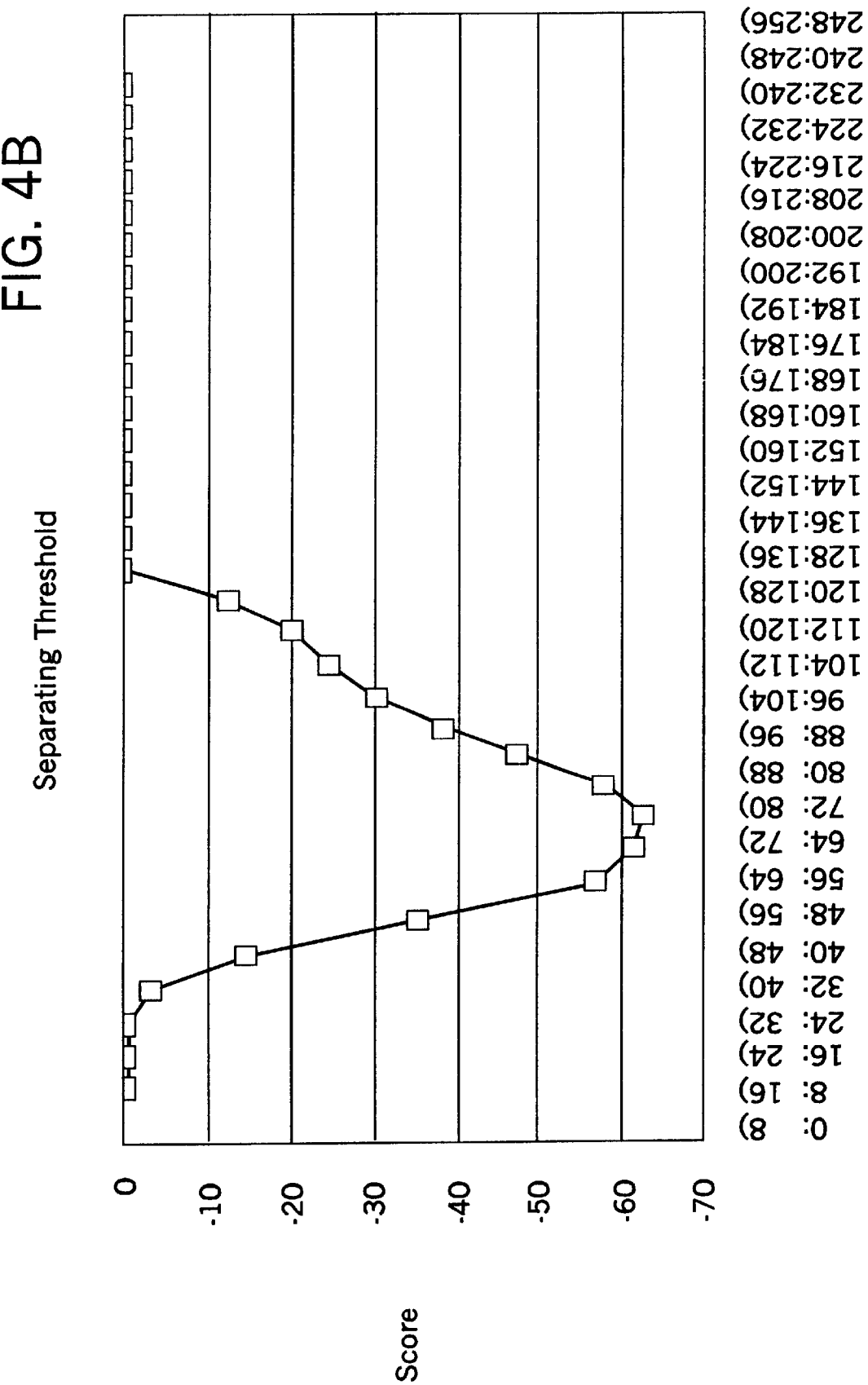

FIG. 4-a shows two histograms typical of the result of the scanning, in gray levels, of a filled-in form. Pixels are counted in for example, 32 classes of gray levels from the darkest one 0–8 to the brightest one 248–256. This illustrates how the invention is capable of dealing with statistical differences between fixed and variable parts gray levels. Actually, in practice, the distributions are never completely disjoint. In the scanning process some pixels gather information from the boundary between text which is the variable part and its background that is not always an ideal plain white area but may vary from a simple plain level of gray to patterns of gray levels as already mentioned above. Then, some of those pixels, although they are filled in pixels, are bright and sometimes brighter than the template.

FIG. 4-b illustrates how, in the preferred embodiment of the invention, a threshold can be set to sort out pixels from the fixed part to the filled part on the basis of their level of gray. In this figure a score is plotted, which measures the deviation of the fixed part histogram from the filled part histogram, as a function of the levels of gray. This is computed from the two populations of pixels shown in FIG. 4-a as follows:

n_fixed: The total number of pixels counted in the fixed part histogram n_filled: The total number of pixels counted in the filled part histogram fixed[t]: the number of pixels less than or equal to t, the level of gray, in the fixed part histogram filled[t]: the number of pixels less than or equal to t, the level of gray, in the filled part histogram p[t]=Filled[t]÷n_filled
is the probability of a filled part pixel having a gray level less than or equal to t score[t]=(fixed[t]−n_fixed×p[t])÷(n_fixed×p[t]×(1−p[t]))$^{0.5}$
measures the deviation of fixed part histogram versus the fille part histogram Then, the separating threshold is the value for which the score function, that is the deviation between the two histograms, is minimal. The minimum occurs, in this particular example, for levels of gray close to 64. In the preferred embodiment this threshold is further evaluated by checking whether, in the population of pixels belonging to the fixed part, less than half of them is below the threshold such that following holds:

$$2 \times \text{fixed}[t] < n\_\text{fixed}$$

If not, the separating threshold is not qualified and no pixel is actually moved from fixed to filled parts.

Figure 5B:
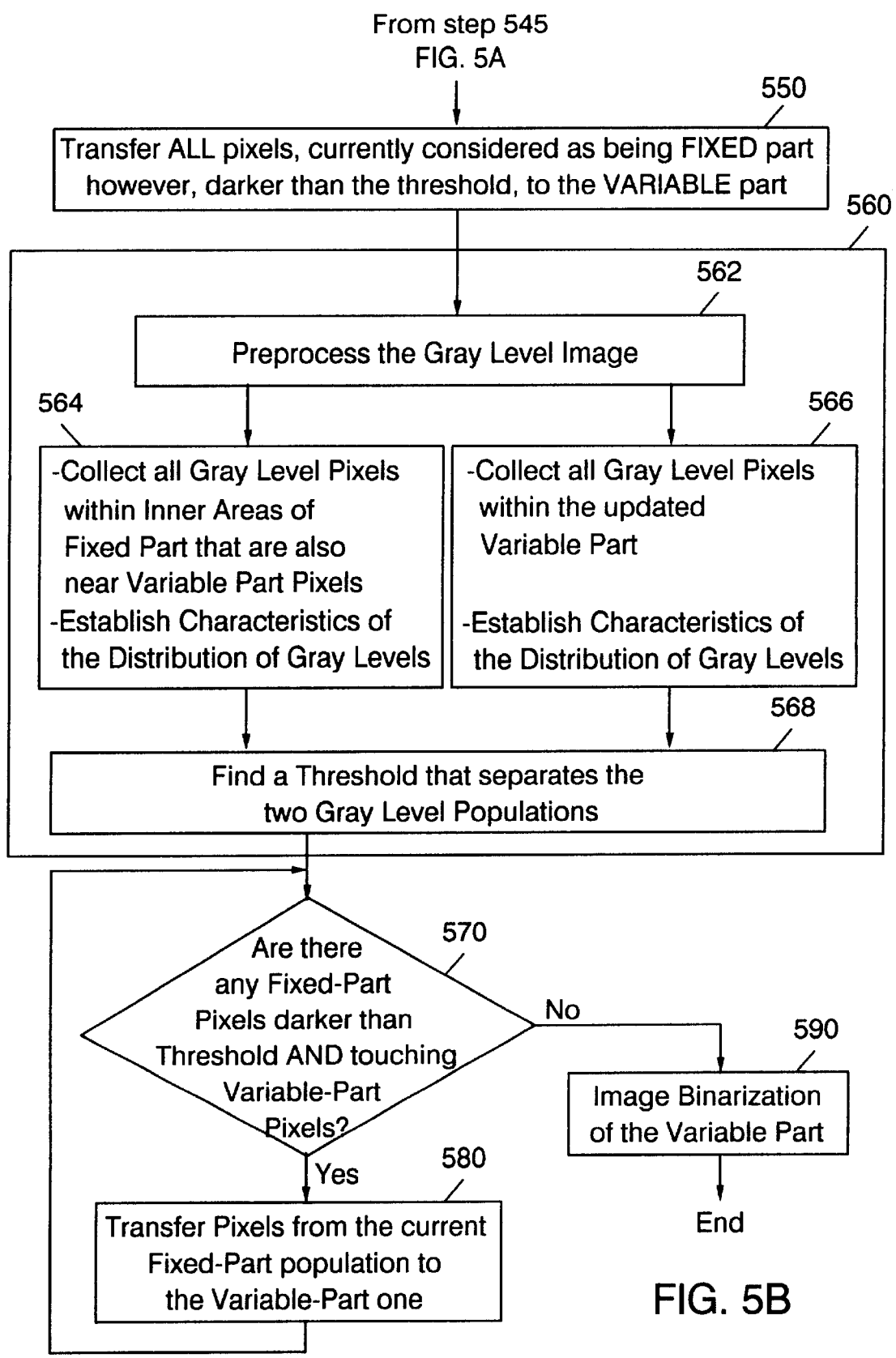
FIG. 5-$a$ is a flow diagram of the initial steps of the invention establishing a first set of statistics of gray levels for the fixed and variables parts that do not overlap.

FIG. 5a is a flow diagram describing the initial steps of the invention including the known steps of fine registration of the template over a binarization, obtained through any well-known technique, from the gray level scanned image. The document is first scanned in gray levels by an appropriate optical reading device now available at low cost. This is done at step 500 and in the following step 510, the result of the scanning is temporarily stored, as is, in the form of gray pixels with 256 levels of gray, in which case an 8-bit octet is required to store each pixel for further processing according to the invention. Step 520 produces a binary or bi-level image of the just obtained gray level image so as to obtain a black and white equivalent, by any well-known appropriate technique. In the next step 530 the template is registered over the binary equivalent of the image. At completion of this step the areas are well defined: the fixed part and the variable parts are separated and it is possible to proceed to step 540 where a first iteration statistic over the gray level pixels stored at step 510 of the fixed part on one hand and variable parts on the other hand are performed separately. These are steps 541 and 542 respectively. These steps and all following ones of FIGS. 5-a and 5-b may be applied to the whole image of a document or on portions of the document in a mosaic of tiles, so as to better differentiate in each tile or sub-portion between the fixed and variable parts. Also, to better estimate the statistics of gray levels in the two regions, those of the pixels in one part that are close to pixels in the other part are removed from this first iteration. This ensures that the statistics are well representative of the areas that are solely template (fixed part) or filled in information (variable part). The definition of the proximity between the fixed and variable parts is a parameter that may need to be adjusted to optimize results however, in the preferred embodiment, a value of 6 pixels is used. Thus, pixels in the two sets of statistics that are less than 6 pixels apart are not taken into consideration in a first iteration because they are suspected of belonging to an overlap area. Step 540 also includes the computation in step 545, of a first separating threshold between the two populations of gray levels. In the preferred embodiment of the invention this is done as explained with respect to FIG. 4-b although other appropriate methods for differentiating statistically between the two populations could be employed instead.

FIG. 5-b is the continuation of FIG. 5-a, further describing the steps of the invention. At step 550, all pixels that were collected from the fixed part areas but which are darker than the separating threshold established from the statistics gathered in previous step 540, are all moved to the variable part population of pixels. However, as explained in FIG. 4-b, mention must be made here that if the separating threshold failed to pass the qualifying test on the pixel distribution of the fixed part, used in the preferred embodiment of the invention, no pixel may actually be moved from the fixed part to the filled part. Regardless of what actually happened in previous steps the processing in gray level of the variable part proceeds with global step 560 which focuses on establishing a second separating threshold value at step 568. This time, the pixels that are close to the variable part pixels are used to establish a statistic of this population at step 564 to be compared with the statistic of the variable part population 566 that was updated at previous step 550 and preprocessed at step 562. In the preferred embodiment this latter step changes, within each square of 4 neighbor pixels, the gray level of each pixel in the square, to the gray level of the darkest pixel. Other averaging methods encompassing more pixels can also be used without departing from the spirit and scope of the invention. Then, computation of a new threshold takes place at step 568, using the technique described in FIG. 4-b or with any equivalent alternate method. The new value of the separating threshold is used in a loop comprising steps 570 and 580 in which all the remaining pixels of the fixed part, darker than the just computed threshold and touching the variable part pixels are moved to fill gaps in the variable part of the image. The loop ends when none are left so the answer to question 570 is negative. The entire process of the invention ends after binarization of the variable part of the image is carried out at step 590 in order to minimize the amount of information to be stored. The result of the above described processing is shown in FIG. 3B.

Although the invention has been shown and described in a preferred embodiment thereof, it will be recognized by those skilled in the art of image processing that various changes in form and detail may be made without departing from the spirit and scope of the invention which is to be measured by the following claims.

We claim:

1. A method for dropping the fixed part of an image of a filled in form document without altering the variable part of the image, said method comprising the steps of:

scanning the filled in form document with a device capable of generating an image of the form comprising picture elements, each picture element defining a level of gray representing a particular brightness of said picture element;

storing the image of the filled in form in gray levels;

retrieving a previously stored image of a fixed part of an image of an unfilled form document;

registering the image of the filled in form over the image of the fixed part for distinguishing between the variable part and the fixed part picture elements from their position;

collecting the picture elements positioned within the fixed part;
   a. excluding those picture elements near the variable part;
   b. morphologically thinning the fixed part by excluding those of the picture elements positioned at the periphery;
   and establishing a first statistic of fixed part picture element levels of gray;

collecting the remaining picture elements, all belonging to the variable part, and establishing a second statistic of variable part levels of gray;

comparing said first and second statistics;

moving those of the fixed part picture elements, statistically significantly different, to the variable part.

2. A method of claim 1, where comparison of said first and second statistics and the moving of fixed part picture elements includes the steps of:

finding a first gray level threshold statistically separating the variable part picture elements from the fixed part picture elements;

moving all picture elements belonging to the fixed part population, darker than the threshold, to the variable part population.

3. The method of claim 2, further including the steps of:

preprocessing the gray level image, selecting groups of neighbor picture elements, weighting their gray level values to a common value;

collecting the picture elements positioned near the variable part, within the fixed part, establishing a third statistic on their levels of gray;

collecting all the picture elements within the updated population of the variable part, establishing a fourth statistic on their levels of gray;

finding a second gray level threshold, computed from the third and fourth statistics, statistically separating the variable part picture elements from the fixed part picture elements;

moving all picture elements belonging to the fixed part population, darker than the second threshold and touching variable part picture elements, to the variable part population.

4. The method of claim 2 further including the steps of:

counting the total number n_fixed of picture elements within the fixed part population;

counting the total number n_filled of picture elements within the variable part population;

counting the number of picture elements fixed[t] less than or equal to a given level of gray [t] in the fixed part population;

counting the number of picture elements filled[t] less than or equal to a given level of gray [t] in the variable part population;

computing the probability p[t] for a filled part picture element having a gray level less than or equal to a given value $$p[t]=\text{filled}[t] \div n\_\text{filled};$$

computing a score function score[t] such that:

$$\text{score}[t]=(\text{fixed}[t]-n\_\text{fixed} \times p[t]) \div (n\_\text{fixed} \times p[t] \times (1-p[t]))^{0.5};$$

setting the separating threshold for the minimum value of the score function.

5. The method of claim 4 further including the step of qualifying the threshold by checking that the number of picture elements below said threshold, in the fixed part population, is less than half the total number of picture elements so that following holds:

$$2 \times \text{fixed}[t] < n\_\text{fixed}.$$

6. The method of claim 1 further including the steps of:

grouping picture elements in squares of adjacent picture elements;

finding the darkest picture element within the group;

weighting the gray level of all picture elements within the group to the one of the darkest picture elements.

7. The method of claim 1 further comprising the steps of:

splitting the whole image into a plurality of subportions;

processing independently each subportion according to the steps of claim 1;

reassembling the subportions to create the variable part.

8. The method of claim 1 further comprising: after processing of the variable part has been completed, generating said variable part in binary levels for the purpose of being permanently stored.

9. A system for dropping the fixed part of an image of a filled in form document without altering the variable part of the image, said method comprising:

means for scanning the filled in form document with a device capable of generating an image of the form comprising picture elements, each picture element defining a level of gray representing a particular brightness of said picture element;

means for storing the image of the filled in form in gray levels;

means for retrieving a previously stored image of a fixed part of an image of an unfilled form document;

means for registering the image of the filled in form over the image of the fixed part for distinguishing between the variable part and the fixed part picture elements from their position;

means for collecting the picture elements positioned within the fixed part;

means for excluding those picture elements within the fixed part that are near the variable part;

means for morphologically thinning the fixed part by excluding those of the picture elements positioned at the periphery; and means for establishing a first statistic of fixed part picture element levels of gray;

means for collecting the remaining picture elements, all belonging to the variable part, and establishing a second statistic of variable part levels of gray;

means for comparing said first and second statistics;

means for moving those of the fixed part picture elements, statistically significantly different, to the variable part.

10. A system of claim 9, where the means for comparing said first and second statistics comprises:

means for finding a first gray level threshold statistically separating the variable part picture elements from the fixed part picture elements;

and where the means for moving of fixed part picture elements comprises:

means for moving all picture elements belonging to the fixed part population, darker than the threshold, to the variable part population.

11. The system of claim 10, further comprising:

means for preprocessing the gray level image;

means for selecting groups of neighbor picture elements;

means for weighting the gray level values of a group of neighbor picture elements to a common value;

means for collecting the picture elements positioned near the variable part, within the fixed part;

means for establishing a third statistic on their levels of gray;

means for collecting all the picture elements within the updated population of the variable part;

means for establishing a fourth statistic on the levels of gray of the updated population of the variable part;

means for finding a second gray level threshold, computed from the third and fourth statistics, statistically separating the variable part picture elements from the fixed part picture elements;

means for moving all picture elements belonging to the fixed part population, darker than the second threshold and touching variable part picture elements, to the variable part population.

12. The system of claim 10 further comprising:

means for counting the total number n_fixed of picture elements within the fixed part population;

means for counting the total number n_filled of picture elements within the variable part population;

means for counting the number of picture elements fixed[t] less than or equal to a given level of gray [t] in the fixed part population;

means for counting the number of picture elements filled[t] less than or equal to a given level of gray [t] in the variable part population;

means for computing the probability p[t] for a filled part picture element having a gray level less than or equal to a given value $$p[t] = \text{filled}[t] \div n\_\text{filled};$$

means for computing a score function score[t] such that:

$$\text{score}[t] = (\text{fixed}[t] - n\_\text{fixed} \times p[t]) \div (n\_\text{fixed} \times p[t] \times (1 - p[t]))^{0.5};$$

means for setting the separating threshold for the minimum value of the score function.

13. The system of claim 12 further comprising:

means for qualifying the threshold by checking that the number of picture elements below said threshold, in the fixed part population, is less than half the total number of picture elements so that following holds:

$$2 \times \text{fixed}[t] < n\_\text{fixed}.$$

14. The system of claim 9 further comprising:

means for grouping picture elements in squares of adjacent picture elements;

means for finding the darkest picture element within the group;

means for weighting the gray level of all picture elements within the group to the one of the darkest picture elements.

15. The system of claim 9 further comprising:

means for splitting the whole image into a plurality of subportions;

means for processing independently each subportion using the means of claim 9; and means for reassembling the subportions to create the variable part.

16. The system of claim 9 further comprising:

means for generating said variable part in binary levels for the purpose of being permanently stored after processing of the variable part has been completed.

* * * * *